2,984,599
PROCESS FOR BONDING TEFLON SHEET TO PREPARED SURFACES

George D. Edwards, Washington, D.C., and Thomas K. Rice, Bloomfield, N.J., assignors to the United States of America as represented by the Secretary of the Navy No Drawing. Filed June 29, 1956, Ser. No. 595,021
6 Claims. (Cl. 154—139)

(Granted under Title 35, U.S. Code (1952), sec. 266)

The invention described herein may be manufactured and used by or for the Government of the United States of America for governmental purposes without the payment of any royalties thereon or therefor.

This invention relates to polytetrafluoroethylene and more particularly to a process for bonding sheets of polytetrafluoroethylene to other materials.

It has long been known that polytetrafluoroethylene may be formed by deposition from an aqueous suspension onto the surface to be coated followed by drying and fusing. However, for certain purposes it is desirable to bond polytetrafluoroethylene in the form of sheets of various thicknesses with or on various other materials.

Bonding of sheets of polytetrafluoroethylene to other materials has proven to be quite difficult because one of the striking physical characteristics of polytetrafluoroethylene is its ability to resist wetting and sticking. In addition it is chemically stable, resisting the action of strong acids and alkalies up to about 500° F. These characteristics, while highly desirable for many purposes, make films or sheets of polyeterafluoroethylene impervious to water and solvents and cements and adhesives will not adhere to their surfaces.

Because of the difficulty in bonding sheets of polytetrafluoroethylene directly, resort has been taken to the expedient of utilizing a primer of polytetrafluoroethylene and rubber and a cement of raw rubber which is vulcanized to form the bond. This expedient, however, destroys the advantages achieved by the use of polytetrafluoroethylene alone and has not proved to be satisfactory for use in the presence of strongly corrosive chemicals.

It is therefore an object of this invention to provide a new and improved method of bonding polytetrafluoroethylene sheet material to other materials.

Another object is to provide a new and improved method of bonding polytetrafluoroethylene sheets to other materials without the use of any bonding agent or cement other than polytetrafluoroethylene itself.

A further object is to provide an improved polytetrafluoroethylene coating with improved adhesive qualities.

Other objects and the attendant advantages of the invention will become apparent to those skilled in the art as the invention is disclosed in the following detailed description.

The foregoing objects are achieved by the precoating with a fused primary coating of polytetrafluoroethylene of the surface of the material to be coated. After this primary coating has been fused and cooled the sheet of polytetrafluoroethylene is placed in contact with the primary coating and the coating and the sheet heated to fusion temperature. As the heat is removed, pressure is applied to bring the coating and the sheet into intimate contact and the pressure is maintained until the assembly has cooled. By this procedure a strong gas-tight bond may be easily produced between the polytetrafluoroethylene sheet and the other material.

The primary coating described above may be produced in any manner which produces a thin film consisting primarily of polytetrafluoroethylene. United States Patent 2,230,654 to Roy J. Plunkett describes a method of preparing polytetrafluoroethylene. Thin films of this material may be produced from aqueous colloidal suspension prepared as disclosed in United States Patents 2,534,058 to Malcom M. Renfrew and 2,478,229 to Kenneth L. Berry. To increase the adherence of the primary coating to the metal or other material being coated chromic acid may be added to the suspension as described in United States Patent 2,562,117 to LeVerne K. Osdal. For use in coating ferrous metals chromic acid and phosphoric acid may be added to the suspension. In utilizing the process of the invention it is, of course, preferable to use the primary coating which has the strongest adherence to the material to be coated. Where such coatings are utilized, however, in order to insure the strongest possible adherence to the sheet of polytetrafluoroethylene a second coating or further coatings of polytetrafluoroethylene deposited from an aqueous colloidal suspension prepared as described in United States Patent 2,613,193 to LeVerne K. Osdal is applied. These secondary coatings should consist primarily of polytetrafluoroethylene for best adherence to the sheets of the same material.

Aqueous colloidal suspensions of polytetrafluoroethylene suitable for use as primary coatings are commercially available from E. I. du Pont de Nemours and Company identified as Teflon Primer for Steel No. 850–201 for use with all ferrous metals, nickel and its alloys, chromium and its alloys, sandblasted glass and unglazed ceramics and as Teflon Primer No. 850–202 for use on aluminum and unglazed ceramics.

Compositions suitable for use as secondary coatings is also available from E. I. du Pont de Nemours and Company as Teflon Clear Finish No. 852–201.

Any number of the primary and secondary coatings may be applied as desired but each coating must be dried and fused prior to the application of the next one.

The surface to which the polytetrafluoroethylene sheet is to be bonded must be clean and smooth. It must be free from all foreign material, corrosion and surface irregularities.

Any materials which will withstand the temperatures involved in the process may be coated. Extremely smooth surfaces such as electroplated metals or glazed ceramics must be scuffed slightly in order to provide a good tooth for the primary coating. To insure a clean surface the surface should be preheated to 400° C. and cooled before the primary coating is applied.

The primary coating may be applied in any desired manner such as dipping or spraying. After being allowed to drain for a period sufficient to remove the excess of the suspensoid the coated surface is oven-dried at about 90° C. During the drying period it is important not to allow the temperature to exceed the boiling point of water as this will produce bubbles in the coating. Under usual conditions the surface should dry in approximately ten minutes.

After the drying period the coating is heated to above the fusion temperature of the polytetrafluoroethylene which is about 327° C. For best results it was found preferable to heat the coating to about 380° C. for ten to fifteen minutes. After the coating cools it is ready for bonding.

Commercially available polytetrafluoroethylene sheets of any desired thickness may be employed in the process of the invention. As the thickness of the sheet increases, greater care must be taken to prevent lateral flow of the polytetrafluoroethylene while the temperature is above the fusion temperature.

As received from the manufacture, the polytetrafluoroethylene sheet material may contain unrelieved stresses.

In certain bonding applications this condition may produce undesirable wrinkling of the sheet material in the finished product. In order to eliminate such stresses, the sheet polytetrafluoroethylene should be annealed, prior to bonding, by heating to the fusion temperature while supported on a flat horizontal surface which allows the polytetrafluoroethylene to expand or contract freely. The sheet should be kept flat and cooled very gradually to prevent the incorporation of additional stresses into the material.

Bonding is accomplished according to this invention by placing the polytetrafluoroethylene sheet material in contact with the coated surface, applying pressure and heating the assembly to a temperature above fusion temperature, i.e. to about 380° C. The sheet should be supported by a resilient temperature resistant cushion, such as glass cloth, which in turn should be supported by a rigid underlying surface having surface contours closely conforming to those of the surface to which the sheet polytetrafluoroethylene is to be bonded.

The polytetrafluoroethylene sheet surface should be in pressurized contact with the precoated surface of the other material while the polytetrafluoroethylene is at or above the fusion temperature and such pressurized contact should be maintained until the assembly had cooled to well below the fushion temperature to obtain a good bond. It has been found that for most applications a pressure of 120 p.s.i. produces a good gas tight bond. If the sheet polytetrafluoroethylene is thick, care must be taken not to increase the pressure so high as to produce lateral flow of the polytetrafluoroethylene and distort the coating. Care should also be taken, for the same reason, not to exert any unnecessary pressure on the surfaces while the assembly is being heated in the furnace. It is preferred, however, to have the surfaces in contact during the heating period so as to prevent premature cooling of the surfaces when the assembly is removed from the furnace.

No critical time appears to be required for bonding, it being necessary only to bring the polytetrafluoroethylene up to above the fusion temperature. It has been found that if the assembly is maintained at a temperature higher than fusion, i.e. about 380° C., for fifteen minutes, a strong gas-tight bond will be produced.

If the polytetrafluoroethylene sheet material is not thick and a glass cloth cushion is used, bonding may take place only along the lines of the weave of the cloth as it was oriented in its original position. To obtain a complete bond under these circumstances the glass cushion should be rotated or shifted with respect to the sheet after the assembly is cooled and the entire bonding cycle repeated.

The following example is given by way of illustration and is not intended as a limitation on the scope of the invention disclosed.

*Example I*

In the testing of the sensitivity of liquid monopropellants for rockets and the like a test known as the "card gap test" is employed. This test evaluates the sensitivity of the liquid explosive or propellant by means of a stack of plastic cards placed between a sample of the liquid and a standard booster charge of high explosive. The desired sensitivity value is taken as the number of cards which attenuates the booster shock just enough to allow the liquid to detonate 50% of the time.

The liquid explosive or propellant under test is held in a cylindrical cup made from a 3.0 in. length of standard 1 in. steel pipe. The cup is closed at the bottom by a thin, flat frangible diaphragm and rests directly on the stack of plastic cards which separates it from the booster charge. The cup must be capable of retaining extremely corrosive liquids without reacting with those liquids.

The cup was made from black, seamless [extruded] steel pipe faced to produce an over-all length of 3.0 in. The pipe was degreased in a solvent bath and the inside inspected to insure a very smooth and clean interior free from pitting and rust. Superficial rust was removed by burnishing with a suitable wire brush. As a final cleaning measure the pipe was heated to 400° C. and then cooled.

The pipe was dipped in a bath of undiluted Teflon Primer for Steel No. 850–201 and set upright on blotting paper for a draining period of ten minutes. The pipe was then set in a drying oven at 90° C. for ten minutes until the coating turned a medium brown following which it was placed in a muffle furnace at 380° C. for fifteen minutes. This was sufficient to fuse the coating into a continuous film 0.3 mil thick. The pipe was removed and allowed to cool.

The pipe was then dipped in Teflon Clear Finish No. 852–201 and oven dried at 90° C. for ten minutes to produce a milky white coating about 1 mil thick. The pipe was then heated in the muffle furnace for fifteen minutes at 380° C. When cooled the surface was ready for bonding. Teflon tape 1½ in. wide and 0.003 in. thick obtained from the United States Gasket Co. was employed as the diaphragm material. The tape was cut into 1¾ in. lengths which were placed singly between two pieces of glass cloth tape, Fiberglas Cloth Tape, Type ECC–B obtained from any suitable commercial source, about 1½ in. wide and 0.005 in. thick, woven from Pyrex fibers. One layer of these "sandwiches" was placed on a smooth, horizontal sheet of stainless steel and covered with a flat piece of asbestos paper about 1/16 in. thick. The asbestos paper provided the light pressure necessary to keep the polytetrafluoroethylene sheet flat. The entire assembly was placed in a muffle furnace at 380° C. After 40 minutes the furnace was turned off and left undisturbed for two hours. The assembly was then removed and when it had come to room temperature the polytetrafluoroethylene pieces were ready for use.

The cup was completed by bonding a piece of the annealed sheet to the polytetrafluoroethylene film which covered the lip at one end of the pipe. This was accomplished by setting the pipe upright on a piece of the annealed polytetrafluoroethylene sheet which was supported by six layers of glass cloth which in turn was supported by a ⅜ in. stainless steel plate. The assembly was placed in a muffle furnace at about 380° C. for fifteen minutes. Immediately upon removal from the furnace weights were placed on the pipe sufficient to apply a bonding pressure of 120 p.s.i. The weights were left in place during the fifteen minute cooling period. After the assembly has cooled the bonding pressure was released by removing the weights. The cushion of glass cloth was then rotated 45 degrees with respect to the polytetrafluoroethylene sheet. The assembly was again heated as before and the bonding cycle repeated.

When the pipe had cooled the weights were removed and the excess polytetrafluoroethylene tape was trimmed off and the cup was leak tested with pressurized air while immersed in a water bath. The polytetrafluoroethylene diaphragm was taut and smooth and was found to withstand an air pressure of several pounds per square inch with no signs of leakage. The cups were found to be non-reactive with such strong corrosive explosives as hydrazine-hydrazine nitrate.

From the foregoing it may be seen that a new and improved method has been provided for bonding polytetrafluoroethylene sheet material to metals and other materials. The bond between the polytetrafluoroethylene and the other material is strong, chemically stable and gas tight.

The process of the invention may be used for the manufacture of chemically inert diaphragms for pressure gauges designed to be used in contact with corrosive liquids or gases. It may also be used in the manufacture of laminates or coatings for use in the manufacture of containers for concentrated acids and the like where it is desired to take advantage of the non-wetting, chemically stable characteristics of the polytetrafluoroethylene.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The method of bonding polytetrafluoroethylene sheets to the surface of an object to provide a stress-free structure comprising coating the object with an aqueous colloidal suspension of polytetrafluoroethylene, heating the coated object to the fusion temperature of polytetrafluoroethylene, cooling said coated object, placing the surface of an annealed sheet of polytetrafluoroethylene in direct contact with the coated surface of said object, heating the assembly to the fusion temperature of polytetrafluoroethylene, and pressing the coated surface and the surface of the polytetrafluoroethylene sheet against one another while annealing them to well below the fusion temperature.

2. The method of bonding sheet polytetrafluoroethylene to another object to provide a stress-free structure comprising coating the surface of the object with finely divided polytetrafluoroethylene in aqueous colloidal suspension, fusing said coating, placing the surface of a sheet of polytetrafluoroethylene in direct contact with the coated surface of the object, fusing the sheet and the coating, and pressing the surface of said sheet against said coated surface while annealing them to well below the fusion temperature.

3. The method of bonding sheet polytetrafluoroethylene to another material to provide a stress-free structure which comprises forming a coating of finely divided polytetrafluoroethylene on the surface of the other material, fusing the polytetrafluoroethylene, placing the surface of a sheet of polytetrafluoroethylene in direct contact with the coating, fusing the coating and the sheet, and pressing the surface of the sheet against the coating as they are annealed to well below the fusion temperature.

4. The method of forming a substantially unstressed polytetrafluoroethylene diaphragm having its periphery bonded to another material to provide a stress-free structure which comprises coating the surface of the other material to be bonded to the diaphragm with a composition containing polytetrafluoroethylene, heating said coating to a temperature just above the fusion temperature of the polytetrafluoroethylene, cooling said coating, placing a peripheral portion of the surface of a sheet of polytetrafluoroethylene in direct contact with said coating, heating the sheet and coating to a temperature above the fusion temperature of the polytetrafluoroethylene, and pressing the surface of said sheet against the coating while annealing them to a temperature well below the fusion temperature at a rate to prevent thermal stresses within the diaphragm.

5. The method of bonding polytetrafluoroethylene sheets to another material to provide a stress-free structure which comprises depositing on the surface of the other material a coating containing polytetrafluoroethylene, drying said coating at a temperature just below the boiling point of water to prevent the formation of bubbles therein, heating said coating to about 380° C., cooling said coating, placing a surface of a sheet of polytetrafluoroethylene in direct contact with said coating, heating the coating and the sheet to about 380° C., and pressing the surface of said sheet against said coating while annealing them to well below the fusion temperature of polytetrafluoroethylene.

6. The method of bonding polytetrafluoroethylene sheets to another material to provide a stress-free structure which comprises pre-coating the surface of the other material with a composition containing polytetrafluoroethylene, drying and fusing said coating at temperatures of about 90° C. and about 380° C. respectively, placing the surface of a sheet of polytetrafluoroethylene in direct contact with said coating, fusing said coating and said sheet, and pressing said coating and the surface of said sheet together while annealing them to well below the fusion temperature of polytetrafluoroethylene.

References Cited in the file of this patent

UNITED STATES PATENTS

| 2,484,484 | Berry | Oct. 11, 1949 |
| 2,578,522 | Edgar | Dec. 11, 1951 |
| 2,705,691 | Panagrossi et al. | Apr. 5, 1955 |
| 2,728,698 | Rudner | Dec. 27, 1955 |
| 2,731,068 | Richards | Jan. 17, 1956 |
| 2,762,116 | Rudner | Sept. 11, 1956 |

FOREIGN PATENTS

| 660,398 | Great Britain | Nov. 7, 1951 |